(12) United States Patent
Na et al.

(10) Patent No.: US 8,005,060 B2
(45) Date of Patent: Aug. 23, 2011

(54) BEAMFORMING TECHNIQUES TO IMPROVE RANGING SIGNAL DETECTION

(75) Inventors: Yanxin Na, Plano, TX (US); Genyuan Wang, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 126 days.

(21) Appl. No.: 12/489,848

(22) Filed: Jun. 23, 2009

(65) Prior Publication Data

US 2010/0321237 A1 Dec. 23, 2010

(51) Int. Cl.
*H04J 1/00* (2006.01)
*H04L 1/02* (2006.01)
*H01Q 3/00* (2006.01)

(52) U.S. Cl. ............................ 370/343; 342/368; 375/267
(58) Field of Classification Search .................. None
See application file for complete search history.

(56) References Cited

U.S. PATENT DOCUMENTS

| | | | | |
|---|---|---|---|---|
| 2004/0178954 A1* | 9/2004 | Vook et al. | ..................... | 342/383 |
| 2007/0076589 A1* | 4/2007 | Stopler et al. | ................. | 370/210 |
| 2009/0066577 A1* | 3/2009 | Kim et al. | ..................... | 342/373 |
| 2009/0103446 A1* | 4/2009 | Yang et al. | ..................... | 370/252 |
| 2009/0147872 A1* | 6/2009 | Chong et al. | ................... | 375/260 |
| 2009/0274222 A1* | 11/2009 | Morelli et al. | ................. | 375/260 |
| 2009/0274234 A1* | 11/2009 | Astely et al. | .................. | 375/267 |
| 2010/0104036 A1* | 4/2010 | Liao et al. | ..................... | 375/260 |
| 2010/0150100 A1* | 6/2010 | Chen et al. | ..................... | 370/330 |

* cited by examiner

*Primary Examiner* — Ricky Ngo
*Assistant Examiner* — Clemence Han
(74) *Attorney, Agent, or Firm* — Edell, Shapiro & Finnan, LLC

(57) ABSTRACT

Ranging code detection techniques are provided. Energy is received at a plurality of antennas of a first wireless communication device and received signals are generated from the received energy. The received energy comprises a ranging transmission from one or more second wireless communication devices, wherein each ranging transmission comprises a ranging code selected from a set of possible ranging codes. A ranging code specific receive beamforming weight vector is generated for a ranging code in the set of possible ranging codes from the received signals. The ranging code specific receive beamforming weight vector is applied to corresponding ranging code specific signals derived from the received signals to produce ranging code specific beamformed signals. The ranging code specific beamformed signals are correlated to produce correlation results. A determination is made as to whether the ranging code is present in the received energy based on the correlation results.

24 Claims, 7 Drawing Sheets

BEAMFORMING TECHNIQUES TO IMPROVE RANGING SIGNAL DETECTION

TECHNICAL FIELD

The present disclosure relates to wireless communication devices and systems and more particularly to detecting ranging signal transmissions from wireless communication devices.

BACKGROUND

In wireless communication networks, a common architecture is to provide a wireless base station device that serves as a gateway for wireless communications with each of multiple client devices, also called mobile stations. The base station may, for example, serve as a gateway to one or more wired networks. An example of such a network is one that involves wireless devices configured to comply with the communication protocol rules of the WiMAX™ communication technology.

A wireless client device transmits a so-called initial ranging signal to the base station in order to join the network for the first time. A ranging signal comprises a ranging code (e.g., a binary pseudo-noise code) of a predetermined number of bits (length) and there are a set of possible ranging codes allocated to a base station serving a coverage area or cell in wireless network. The base station responds to a received ranging signal with a ranging response that includes information such as transmission parameters (modulation type, coding rate and transmit power) and the wireless client device uses the received ranging response to determine timing offset in order to begin communicating data with the base station. This ranging mechanism may be repeated on occasion or periodically to update transmission parameters or to request bandwidth. In addition, a somewhat similar ranging process may be performed when a wireless client device is seeking hand-over from one base station to another base station.

Many modern wireless communication networks employ base stations that have multiple antennas and can therefore improve performance using beamforming techniques, both for received signals and transmitted signals. In most operating environments, a base station may be communicating with numerous wireless client stations. It is not uncommon for the base station to receive multiple ranging signals transmitted from wireless client devices at nearly the same time. Beamforming techniques can be exploited at the base station for the received signals, but due to the potential for overlap between ranging signals transmitted from two or more wireless client devices, traditional beamforming weight estimation techniques make it difficult to accurately estimate the receive beamforming weights to be used for a given ranging code in a received transmission.

DESCRIPTION OF EXAMPLE EMBODIMENTS

Overview

Techniques are provided herein to detect ranging codes in energy received at a plurality of antennas of a wireless communication device. Energy is received at a plurality of antennas of a first wireless communication device and received signals are generated from the received energy. The received energy comprises a ranging transmission from one or more second wireless communication devices, wherein each ranging transmission comprises a ranging code selected from a set of possible ranging codes. A ranging code specific receive beamforming weight vector is generated for a ranging code in the set of possible ranging codes from the received signals. Each ranging code specific receive beamforming weight vector is applied to corresponding ranging code specific signals derived from the received signals to produce ranging code specific beamformed signals. The ranging code specific beamformed signals are correlated to produce correlation results. A determination is made as to whether the ranging code is present in the received energy based on the correlation results.

Example Embodiments

Figure 1:
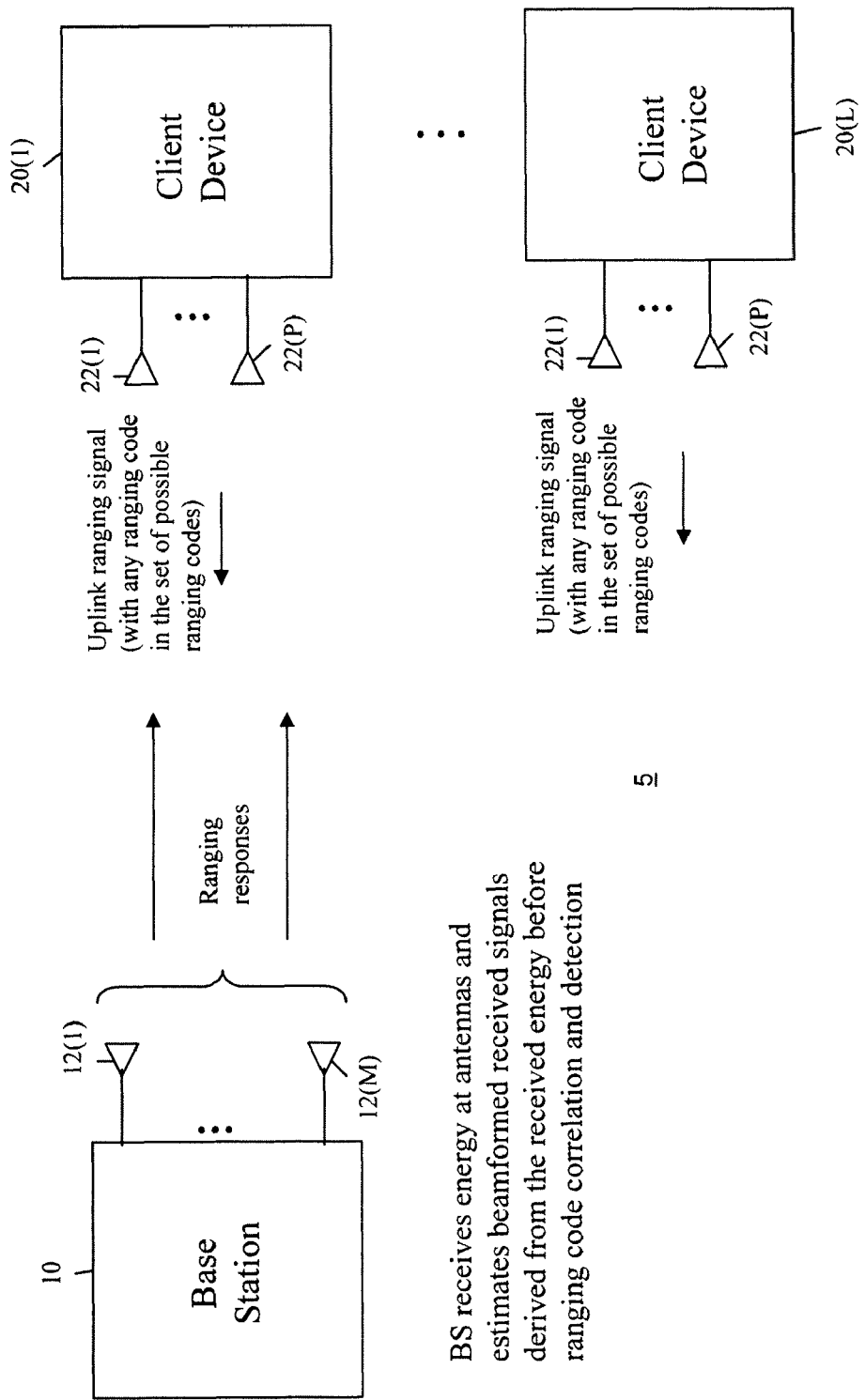
FIG. 1 is block diagram of a wireless communication network in which a base station device is configured to perform receive beamforming ranging code detection with respect to ranging transmissions from client devices.

Referring first to FIG. 1, a wireless communication network is shown at reference numeral 5. A wireless base station 10 comprising a plurality of antennas 12(1)-12(M) is provided to serve wireless communications with a plurality of wireless client devices 20(1)-20(L). Each wireless client device 20(1)-20(L) comprises at least one antenna, but in general it may comprise a plurality of antennas 22(1)-22(P). The base station 10 may be referred to herein as a first wireless communication device and the wireless client devices 20(1)-20(L) as second wireless communication devices.

Any given one of the wireless client devices 20(1)-20(L) may make a ranging transmission to the base station 10 at any time. For example, a client device may send an initial ranging transmission to initially join the network at the base station 10. The base station 10 responds to a received initial ranging transmission with a ranging response that includes information such as transmission parameters (modulation type, coding rate and transmit power) and the wireless client device uses the received ranging response to determine timing offset in order to begin communicating data with the base station. A wireless client device may send a ranging transmission for a bandwidth request or to periodically update transmission parameters that is uses in communicating with the base station 10. Still further, a wireless client device may transmit a ranging signal when seeking a hand-over from one base station.

When sending a ranging signal on the uplink to the base station 10, a wireless client device selects a ranging code from among a set of possible ranging codes. For example, in a WiMAX™ communication system, the ranging codes comprise 256 unique, length 144, codes. A subset of the 256 codes are allocated for initial ranging codes, another subset for periodic ranging codes, another subset for bandwidth request ranging codes and still another subset for hand-over ranging codes.

Again, at any given time, multiple ones of the wireless client devices 20(1)-20(L) may send a ranging transmission with one of the ranging codes in the set to the base station 10. It is rather likely that ranging transmissions from at least two wireless client devices will overlap in time and frequency. Accordingly, the base station 10 is configured to receive the energy at its plurality of antennas 12(1)-12(M), which energy may include ranging signals, and to estimate the beamforming weights to be applied to received signals derived from the received energy before performing ranging code correlation and detection analysis on the received signals.

Figure 2:
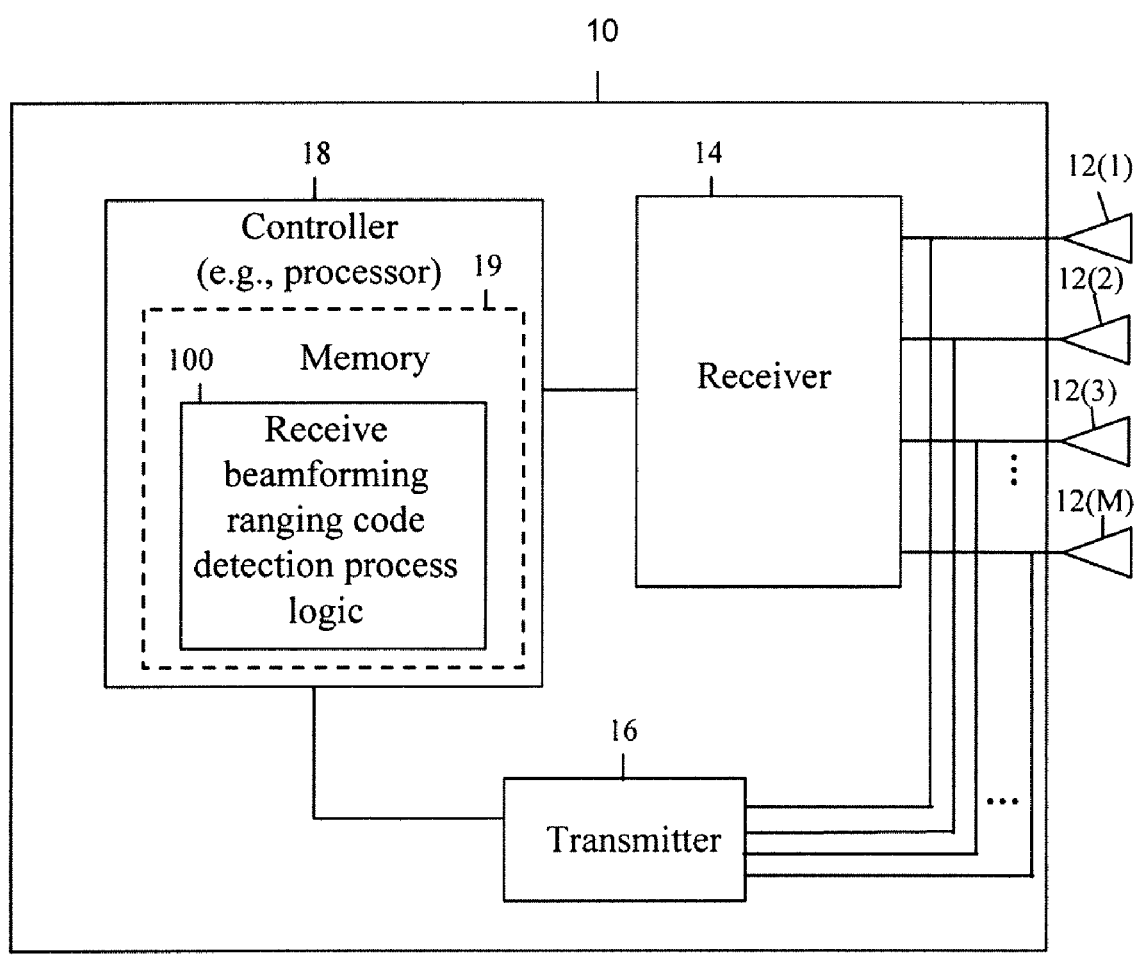
FIG. 2 is a block diagram of a base station configured to perform receive beamforming ranging code detection of ranging transmission.

Reference is now made to FIG. 2 for a description of a wireless communication device, e.g., base station 10, that is configured or equipped to perform the aforementioned receive beamforming and ranging code correlation techniques. The base station 10 comprises a receiver 14, a transmitter 16 and a controller 18. The controller 18 supplies data to the transmitter 16 to be transmitted and processes signals received by the receiver 14. In addition, the controller 18 performs other transmit and receive control functionality. Parts of the functions of the receiver 14, transmitter 16 and controller 18 may be implemented in a modem and other parts of the receiver 14 and transmitter 16 may be implemented in radio transmitter and radio transceiver circuits. It should be understood that there are analog-to-digital converters (ADCs) and digital-to-analog converters (DACs) in the various signal paths to convert between analog and digital signals.

The receiver 14 receives the signals detected by each of the antennas 12(1)-12(M) and supplies corresponding antenna-specific receive signals to the controller 18. It is understood that the receiver 14 may comprise a plurality of individual receiver circuits, each for a corresponding one of a plurality of antennas 12(1)-12(M) and which outputs a receive signal associated with a signal detected by a respective one of the plurality of antennas 12(1)-12(M). For simplicity, these individual receiver circuits are not shown. The transmitter 16 may comprise individual transmitter circuits that supply respective upconverted signals to corresponding ones of a plurality of antennas 12(1)-12(M) for transmission. For simplicity, these individual transmitter circuits are not shown.

The controller 18 is, for example, a signal or data processor that comprises a memory 19 or other data storage block that stores data used for the techniques described herein. The memory 19 may be separate or part of the controller 18. Instructions associated with receive beamforming ranging code detection process logic 100 may be stored in the memory 19 for execution by the controller 18.

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein and stores software or processor instructions that are executed to carry out the computations described herein. Thus, the process logic 100 may take any of a variety of forms, so as to be encoded in one or more tangible media for execution, such as with fixed logic or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof. For example, the controller 18 may be a modem in the base station and thus be embodied by digital logic gates in a fixed or programmable digital logic integrated circuit, which digital logic gates are configured to perform the process logic 100.

Figure 3:
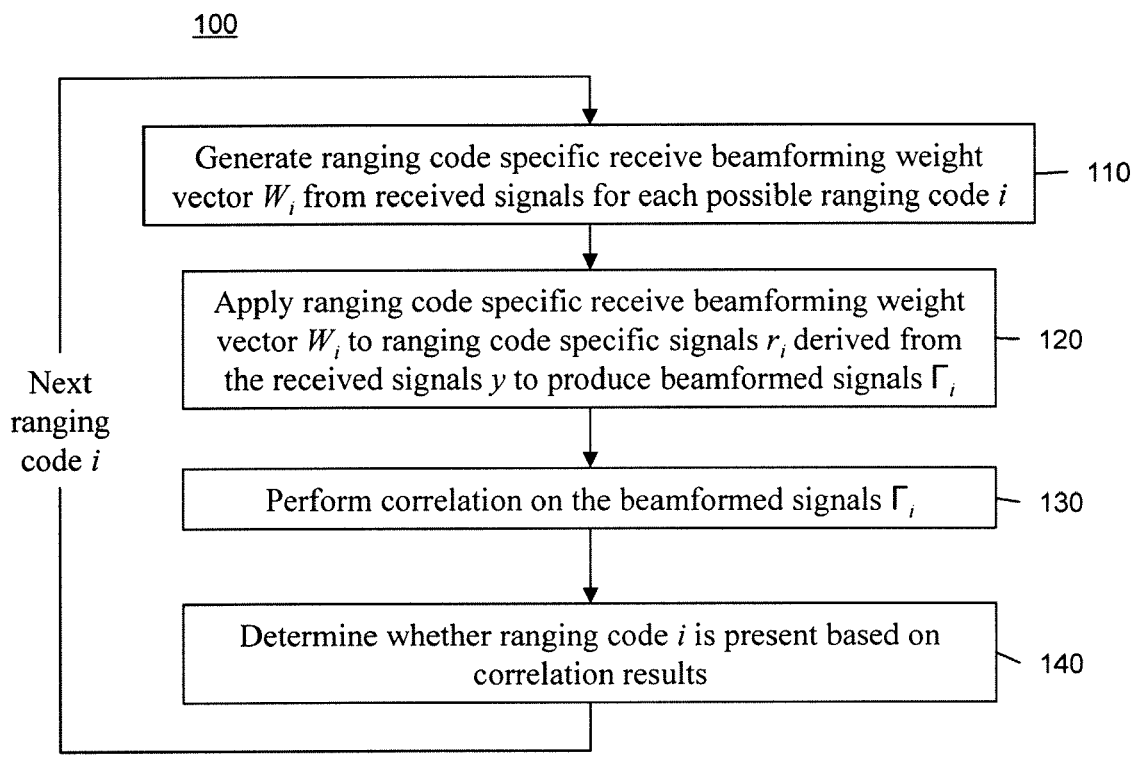
FIG. 3 is a flow chart that generally depicts the receive beamforming ranging code detection process logic that is executed by the base station.

Turning now to FIG. 3, the receive beamforming ranging code detection process logic 100 is described. Unlike other ranging code detection methods that calculate and apply beamforming weights after ranging code correlation, the receive beamforming ranging code detection process logic 100 involves computing and applying receive beamforming weights before the correlation computations.

The base station (or other wireless device that receives and processes ranging signals) receives energy at its plurality of antennas and generates received signals from the received energy. As explained above, the received energy comprises a ranging transmission from one or more wireless client devices. Each ranging transmission comprises a ranging code selected from a set of possible ranging codes. The $i^{th}$ ranging code may be denoted $C_i=[c_i(1),c_i(2),\ldots,c_i(144)]$ for a length 144 code.

At 110, the base station generates a ranging code specific receive beamforming weight vector $W_i$ for ranging code i from the received signals. The process 100 may be executed entirely through with respect to one ranging code i, and then repeated thereafter for a next ranging code. In another form, the functions of 110-130 may be performed for all ranging codes and then at 140 a determination is made as to which ranging code(s), if any, are present using the correlation results computed for all of the possible ranging codes.

Figure 4:
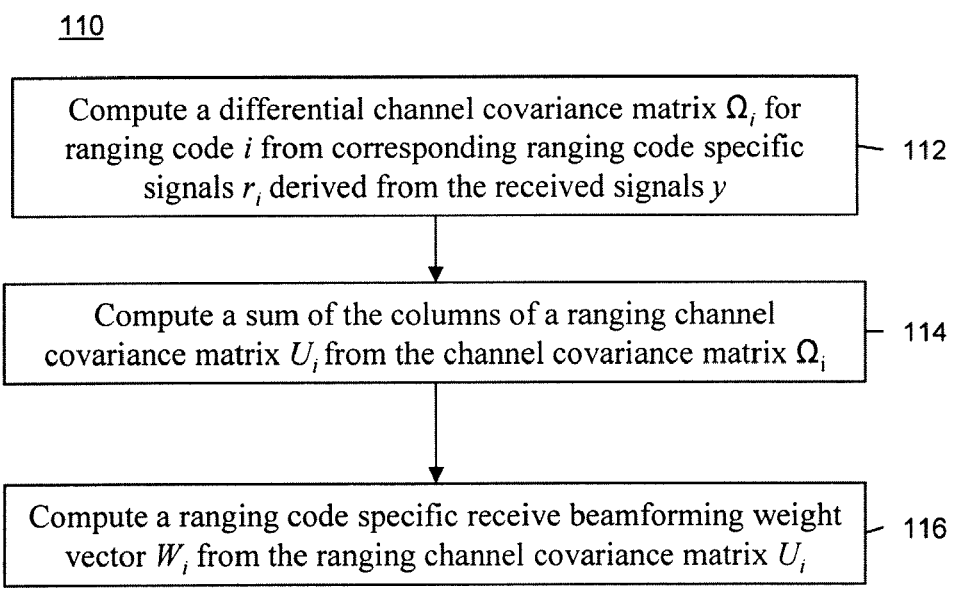
FIG. 4 is a flow chart for logic that computes a ranging code specific beamforming weight vector as part of the receive beamforming ranging code detection process logic.

Reference is now made to FIG. 4 for a more detailed description of function 110. For purposes of the following description, the term "ranging code specific signals" is introduced to refer to signals that are derived from the received signals (referred to above in connection with function 110). In an orthogonal frequency division multiplexed (OFDM) system such as WiMAX, the received signals at the plurality of antennas 12(1)-12(M) may be represented in the frequency domain by a vector y(1:M, 1:FFTsize), where "FFTsize" represents the size of a Fast Fourier Transform (FFT) operation employed at the base station on the received energy at each antenna for transferring time domain signals to frequency domain signals. The ranging code specific signals are denoted as $r_i$ (where $r_i=y.*x_i$) and are signals obtained after applying an element-by-element multiplication operation of the received signals vector y and a vector $x_i$ that is derived from a corresponding ranging code $C_i$.

In an example of a transmission sent according to the particular usage of subcarrier (PUSC) mode of WiMAX, the vector $x_i$ is defined as $x_i(1:M,[J_I+1:J_I+4, \ldots, J_n+1:J_n+4, \ldots, J_{Ntile}+1:J_{Ntile}+4])=\text{kron}(\text{ones})M,1), C_i)$, where $J_n+1$ to $J_n+4$ are subcarrier indices in tile n of a PUSC transmission for ranging code i, $N_{tile}$ denotes the total number of tiles for ranging code i, and kron(A,B) denotes the Kronecker product (a special case of a tensor product) of A and B.

At 112, a differential channel covariance matrix $\Omega_i$ is computed for the ranging code from corresponding ranging specific signals $r_i$, where $$\Omega_i = \sum_{n=1}^{N_{tile}} (r_i(:, J_n+1)r_i^H(:, J_n+2) + $$
$$r_i(:, J_n+2)r_i^H(:, J_n+3) + r_i(:, J_n+3)r_i^H(:, J_n+4)),$$

where $r_i$ denotes the ranging code specific signals described above and $^H$ denotes the Hermitian operation.

Figure 5:
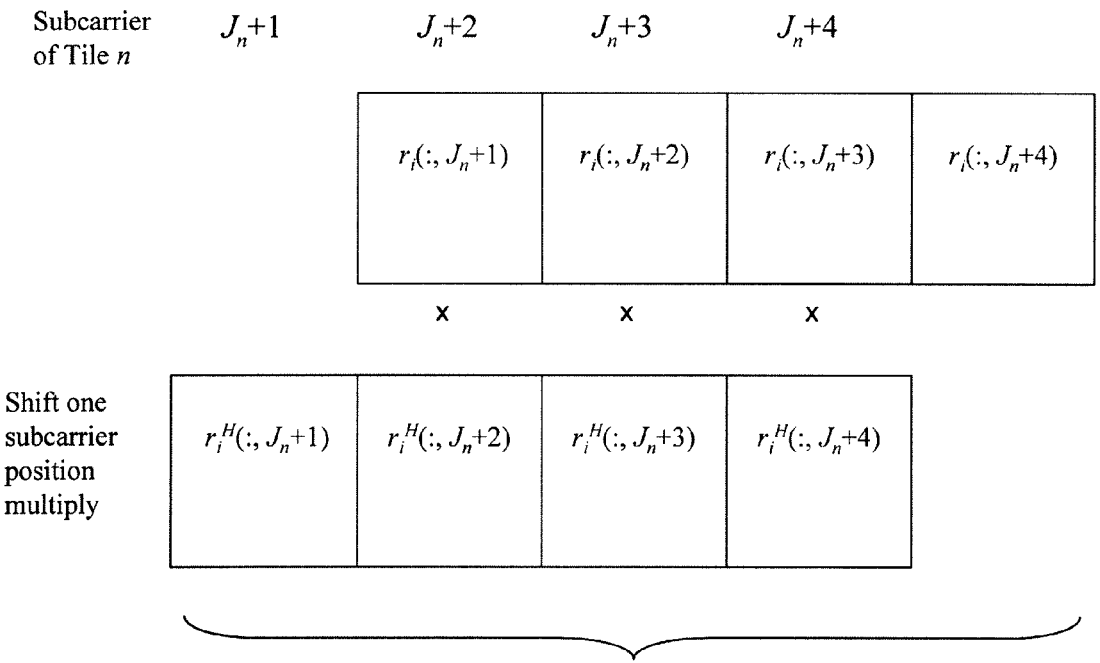
FIG. 5 is a diagram depicting a computation of a differential channel covariance matrix as part of the receive beamforming ranging code detection process logic.

FIG. 5 is a diagram that illustrates the elements that are multiplied together in the summation for the differential channel covariance matrix $\Omega_i$. In the example shown in FIG. 5, there are four subcarriers in the $n^{th}$ tile, denoted $J_n+1$, $J_n+2$, $J_n+3$ and $J_n+4$. The differential nature of the matrix $\Omega_i$ is derived by shifting one subcarrier position and multiplying elements corresponding to offset subcarrier positions (e.g., $r_i(:,J_n+1)r_i^H(:,J_n+2)$) to produce differential products, and so on. This computation is made for each of the M antennas, where the "differential products" are added together, and repeated and accumulated over all of the tiles, Ntile, to produce column vectors $\Omega_{i,1}, \Omega_{i,2}, \ldots, \Omega_{i,M}$ for corresponding antennas 1 to M The differential channel covariance matrix $\Omega_i$ for a given ranging code i is constructed from $\Omega_{i,1}, \Omega_{i,2}, \ldots, \Omega_{i,M}$. In other words, the summation of the differential products for a given ranging code i produces an M by M matrix, $\Omega_i$, comprises of column vectors $\Omega_{i,1}, \Omega_{i,2}, \ldots, \Omega_{i,M}$, or the elements $\Omega_{i,11}, \Omega_{i,12}$, etc. Thus, said more generally, the differential channel covariance matrix is obtained by computing, for each of the plurality of antennas, a sum, over a plurality of groups of subcarriers, of products obtained from multiplication of values of the ranging code specific signals for the ranging code at different subcarriers within a corresponding group of subcarriers.

At 114, a sum of the columns of a ranging channel covariance matrix $U_i$ is computed from the corresponding differential channel covariance matrix $\Omega_i$ using maximum ratio combining techniques. That is, the ranging channel covariance matrix $U_i$ is computed as $U_i = \Omega_{i,1} + e^{j\Theta_2}\Omega_{i,2} + \ldots + e^{j\Theta_M}\Omega_{i,M}$, where $e^{j\Theta_m} = \{\Omega_{i,m}\}^H\Omega_{i,1}/(abs(\{\Omega_{i,m}\}^H\Omega_{i,1}))$ for $2 \leq m \leq M$ is the phase rotation of a given column relative to the first column.

At 116, the ranging code specific beamforming weight vector $W_i$ is computed from the ranging channel covariance matrix $U_i$. For example, the sum of the columns of the ranging channel covariance matrix are normalized to obtain the ranging code specific receive beamforming weight vector, i.e., $W_i = U_i/(norm(U_i))$, where $norm(\,)$ is the Euclidean norm operation.

Computing the ranging code specific receive beamforming weight vector from the differential channel covariance matrix in the manner depicted in FIG. 4 and described herein achieves processing gain and cancels out the influence of other ranging codes.

Referring back to FIG. 3, the next function in the process 100 is to apply the ranging code specific beamforming weight vector $W_i$ to the ranging code specific signal vector $r_i$ to produce beamformed signals denoted $\Gamma_i$, by the computation $\Gamma_i = W_i^H r_i$.

At 130, a correlation computation is performed on the beamformed signals $\Gamma_i$. For example, an inverse FFT (IFFT) operation is employed to compute a correlation as $\Lambda_i = abs$ $(IFFT(\Gamma_i, FFTsize))^2$, where FFTsize is the size of the IFFT employed, such as 512, and abs( ) is the absolute value operation.

At 140, a determination is made as to whether the ranging code i is present based on the correlation results $\Lambda_i$ computed at 130. One example for the determination function 140 is described hereinafter in conjunction with FIG. 6. After the termination is made at 140, the process 100 may be repeated for the next ranging code i+1 in the set of possible ranging codes.

Figure 6:
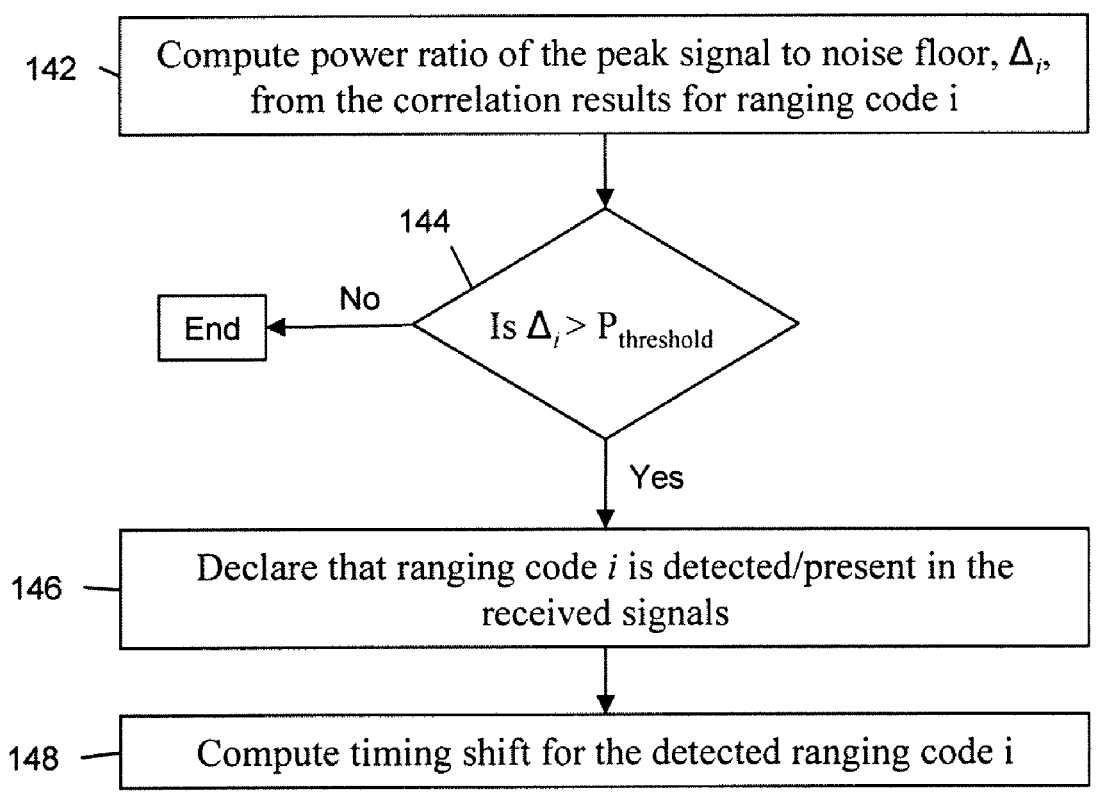
FIG. 6 is a flow chart for logic that analyzes correlation results to determine whether a ranging code is present as part of the receive beamforming ranging code detection process logic.

With reference now to FIG. 6, a technique is described herein for determining whether a ranging code is present in the received energy based on the correlation results $\Lambda_i$ computed at 130. At 142, a power ratio of the peak signal to noise floor, $\Delta_i$, is computed from the correlation results $\Lambda_i$. For example, for an initial ranging code in a WiMAX system and with an FFTsize of 512, the computation is $$\Delta_i = \frac{\max(\Lambda_i(1:512))}{P_{noise}}$$

and for periodic ranging, the computation is $$\Delta_i = \frac{\max(\Lambda_i\{[1:32, (512-90):512]\})}{P_{noise}},$$

where $P_{noise}$ is the power of the noise floor, and where The difference between the computations for initial ranging and periodic ranging is because the possible time offsets for initial ranging and periodic ranging are different. The possible time offsets for initial ranging are within one OFDM symbol that implies [0, 511] sampling intervals whereas the possible time offset for periodic ranging is inside a cyclic prefix (CP) range of one OFDM symbol that implies [0, 63] sampling intervals. At 144, the power ratio $\Delta_i$ is compared with a threshold, $P_{threshold}$ and if it exceeds the threshold, then at 146, the ranging code i is declared to be detected in the received signals. Next, at 148, the timing shift with respect to the received ranging transmission is computed. Again, in the example of a WiMAX system, the timing shift for initial ranging is computed as $\tau_i = (k_i + N_{cp} - 1)_{mod(512)}$, where $$k_i = \underset{ki}{\operatorname{argmax}}(\Lambda_i(1:512)),$$

and $N_{cp}$ is the number of sampling intervals in the CP range, such as $N_{cp}=64$, and 512 is the FFT size, and for periodic ranging as $\tau_i = (k_i + N_{cp} - 1)_{mod(512)}$, where $$k_i = \underset{ki}{\operatorname{argmax}}(\Lambda_i([1:32, (512-90):512])),$$

where $k_i$ is an index corresponding to a maximum value or peak of $\Delta_i$ within a specific range of $\Delta_i$ (first 32 values and last 91 values).

As explained above, the process 100 may be carried through entirely for one ranging code i to determine whether that ranging code is present or detected before proceeding to consider the next ranging code in the set of possible ranging codes. After the timing shift $\tau_i$ has been computed based on the detection of a given ranging code as explained above (using the computed beamforming weight vector prior to computed the correlation results), the timing shift value may be used to compute correlation results for the corresponding specific ranging code without applying the receive beamforming techniques beforehand as $$B_i = \sum_{m=1}^{M} \left| \sum_{n=1}^{Ntile} \sum_{p=1}^{4} r(m, (J_n + p)) \exp(j2\pi\tau_i(J_n + p - 1)/512) \right|^2$$

where m is the index of antennas, n is the index of tiles of a PUSC transmission for ranging code i, $N_{tile}$ denotes the total number of tiles for ranging code i, for example $N_{tile}$=36 when the length of ranging code is 144, p is the index of subcarriers inside a tile $1 \leq p \leq 4$, and |x| is norm or absolute value operation on the received signal vector x. The power ratio $B_i$ for the computed correlation results is computed and then compared with a threshold similar to that explained above in connection with FIG. 6 to determine whether the specific ranging code present. In very low signal-to-noise conditions, there may be a substantial noise impacting the beamforming weight vector estimation, such that the desired signal power could be reduced. The peak value that results from the beamforming processing may not be very high. Thus, a peak is suspected to be presented but further confirmation may be desired and this further confirmation is made by performing correlation for that ranging code without beamforming. The process of correlation without beamforming does not reduce the total power (signal and noise) as beamforming does. Therefore, better peaks (with more power strength) may be observed (without beamforming) when that ranging code is present.

Figure 7:
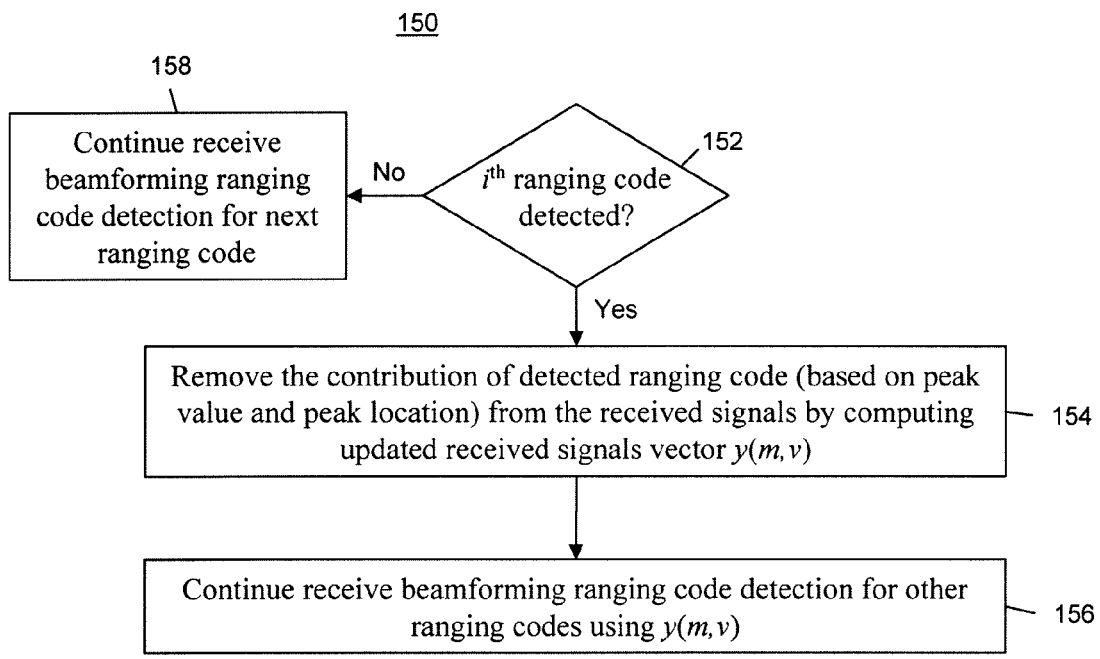
FIG. 7 is a flow chart for logic that removes from the received signals a contribution associated with a detected ranging code as part of the receive beamforming ranging code detection process logic.

Referring to FIG. 7, a further process 150 is described that is useful once a ranging code has been detected. At 152, when the code detection determination analysis at 140 determines that a given ranging code is detected, then at 154, the contribution of the detected ranging code is removed from the received signals vector y based on the peak value and peak location associated with the detected ranging code. In so doing, an updated receive signals vector is computed as y(m, v)=y(m,v)−(A$_i$W$_i$(m)x$_i$(m,v)e$^{−j2\pi f_i v/512}$)512/144 in case of a length 144 ranging code and 512 FFT size in the example of a WiMAX system, where A$_i$=Λ$_i$(f$_i$),f$_i$ is the index of the peak location of Λ$_i$, v is a subcarrier index and m is an antenna index. If a generalized IFFT function is employed, the value of 512 in the computation of y(m,v) is not used. After the updated received signals vector y(m,v) is computed, then at 156, the process 100 is repeated beginning at 110 (FIG. 1) for the next ranging code i using the updated received signals vector y(m,v). When the ranging code i is not detected, then as indicated at 158, the ranging code detection process resumes at function 110 in FIG. 1 for the next ranging code in the set of possible ranging codes.

Figure 8:
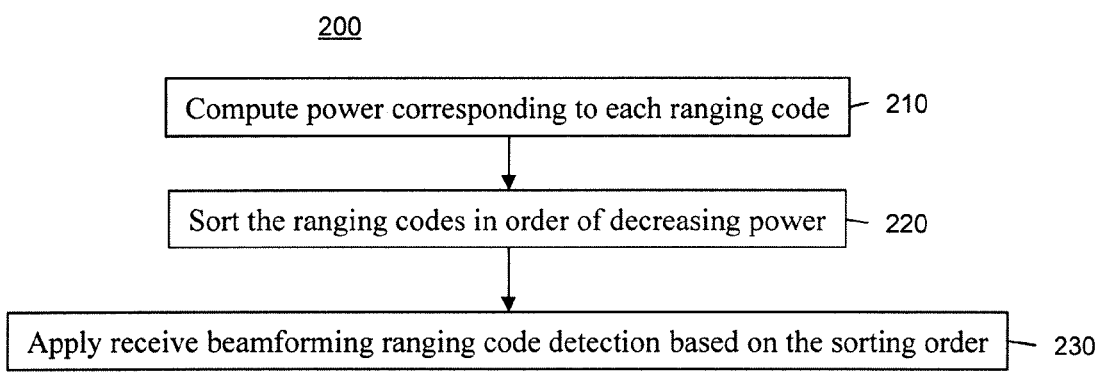
FIG. 8 is a flow chart for logic that sorts the power computed from the correlation results from multiple ranging codes as part of the receive beamforming ranging code detection process logic in order to improve the detection of a ranging code.

Referring to FIG. 8, another process 200 is described. The process 200 is performed prior to execution of process 100 in order to produce an order of ranging codes to be followed for processing by process 100, such that higher power ranging codes are processed first. At 210, the power of the i$^{th}$ ranging code is computed. For example, in the case of a WiMAX system, the power of the i$^{th}$ ranging code is computed as $$R_i = \sum_{m=1}^{M} \sum_{n=1}^{Ntile} \left| \sum_{p=1}^{4} r(m, (J_n + p)) \right|,$$

for an M antenna base station device, where n is the index of tiles of a PUSC transmission for ranging code i, $N_{tile}$ denotes the total number of tiles for ranging code i, for example $N_{tile}$=36 when the length of ranging code is 144, and p is the index of subcarriers inside a tile $1 \leq p \leq 4$, and m is the antenna index.

After the power $R_i$ is computed for each ranging code, then at 220, the ranging codes are sorted in order of decreasing power. At 230 after the sorting function, the ranging codes with the higher powers (and above a threshold) are analyzed for presence detection by process 100 before ranging codes with lower power. Applying this power-based sorting process prior to the beamforming computation and correlation analysis has advantages in very low signal-to-noise conditions. By evaluating first the received signals (and ranging codes) with the highest power, the probability of correct detection of a given ranging code is higher. Moreover, when a ranging code is detected, its contribution to the received signals is removed and in so doing (based on the sorted order of decreasing power), its removal will substantially reduce interference with other ranging code transmissions, making detection of other ranging codes more likely.

The functions depicted in FIGS. 7 and 8 may be combined such that the ordered processing of ranging codes is followed by removal from the received signals of a contribution associated with a detected ranging code. Thus, the next ranging code to be detected (in accordance with the sorted order of decreasing power) is made with respect to updated received signals computed from the removal of the contribution associated with the previous ranging code that was determined to be detected in the received energy.

Figure 9:
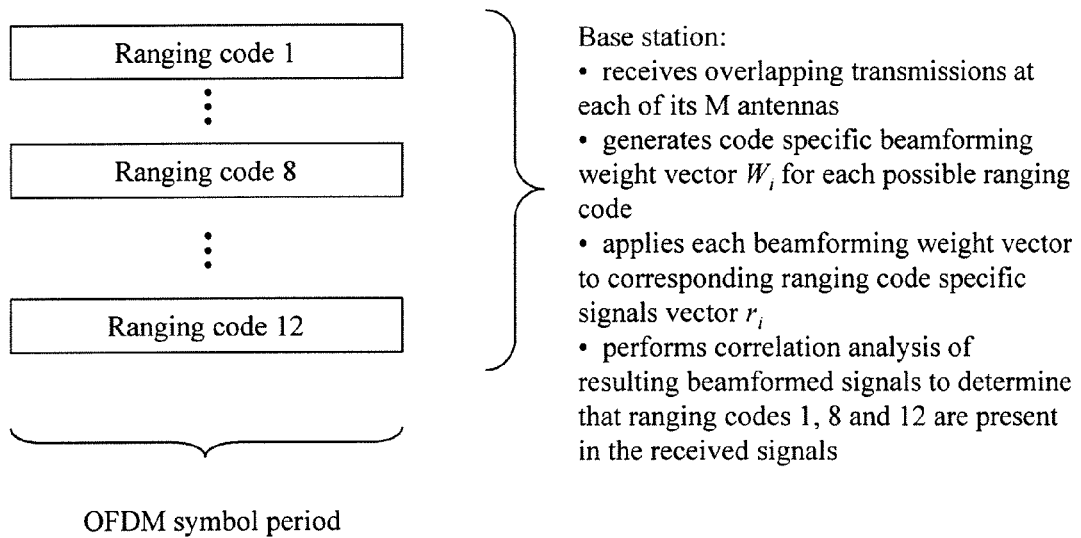
FIG. 9 is a diagram that depicts an example of the operation of the receive beamforming ranging code detection process logic in detecting multiple ranging codes.

FIG. 9 summarizes the ranging code detection process described herein. Ranging transmissions are made from multiple client devices to the base station. For example, a first client device makes a transmission with ranging code 1, a second client device makes a transmission with ranging code 8 and a third client device makes a transmission with ranging code 12. These transmissions at least partially overlap in some manner during an OFDM symbol period. The base station detects received energy containing the overlapping transmissions at each of its M antennas, generates ranging code specific beamforming weight vectors W$_i$ for each possible ranging code i, applies each ranging code specific beamforming weight vector to corresponding ranging code specific signals vector r$_i$, performs correlation analysis of the resulting beamformed signals and determines that ranging codes 1, 8 and 12 are present in the received signals. The base station then generates an appropriate response message to each ranging transmission for transmitting back to each of the corresponding client devices that sent those ranging transmissions.

Improved performance is achieved for initial ranging, periodic ranging, bandwidth request ranging and hand-over ranging using the techniques described herein. In addition, these techniques can reduce the size of the set of ranging codes and also reduce the complexity involved at the device that receives and processes the received ranging transmissions. In particular, the number of computations necessary to detect a ranging code using the techniques described herein is reduced by nearly one-half.

Although the apparatus, logic, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, logic, and method, as set forth in the following claims.

What is claimed is:

1. A method comprising:
   receiving energy at a plurality of antennas of a first wireless communication device and generating received signals from the received energy, wherein the received energy comprises a ranging transmission from one or more second wireless communication devices, wherein each ranging transmission comprises a ranging code selected from a set of possible ranging codes;
   generating from the received signals a ranging code specific receive beamforming weight vector for a ranging code in the set of possible ranging codes;
   applying the ranging code specific receive beamforming weight vector to corresponding ranging code specific signals derived from the received signals to produce ranging code specific beamformed signals;
   correlating the ranging code specific beamformed signals to produce correlation results; and
   determining whether the ranging code is present in the received energy based on the correlation results.

2. The method of claim 1, and wherein generating comprises generating a differential channel covariance matrix for the ranging code from the corresponding ranging code specific signals and the received signals and computing the ranging code specific receive beamforming weight vector from the differential channel covariance matrix.

3. The method of claim 2, wherein generating the differential channel covariance matrix comprises computing, for each of the plurality of antennas, a sum, over a plurality of groups of subcarriers, of products obtained from multiplication of values of the ranging code specific signals for the ranging code at different subcarriers within a corresponding group of subcarriers.

4. The method of claim 2, wherein generating further comprises computing a sum of columns of a ranging channel covariance matrix from the differential channel covariance matrix and computing the ranging code specific beamforming weight vector from the ranging channel covariance matrix.

5. The method of claim 4, wherein correlating comprises computing a power ratio of a peak signal-to-noise floor from the correlation results, and wherein determining comprises comparing the power ratio with a threshold and determining that the ranging code is present in the received energy when the power ratio exceeds the threshold.

6. The method of claim 5, and further comprising computing a timing shift for the ranging code determined to be present from the correlation results.

7. The method of claim 6, and further comprising computing correlation results for one or more other ranging codes based on the received signals using the timing shift.

8. The method of claim 6, and further comprising removing from the received signals a contribution associated with the ranging code determined to be present in the received energy and based further on the timing shift to thereby produce updated received signals, and thereafter performing said generating, applying, correlating and determining for another ranging code in the set of possible ranging codes based on the updated received signals.

9. The method of claim 1, wherein determining comprises computing a power corresponding to each ranging code in the set from respective ranging code specific signals that are derived from the received signals, sorting the ranging codes in order of decreasing power, and performing said generating, applying, correlating and determining for each ranging code in said order.

10. The method of claim 9, and further comprising removing from the received signals a contribution associated with the ranging code determined to be present in the received energy to thereby produce updated received signals, and thereafter performing said generating, applying, correlating and determining for another ranging code in the set of possible ranging codes based on the updated received signals.

11. The method of claim 1, and further comprising removing from the received signals a contribution associated with the ranging code determined to be present in the received energy to thereby produce updated received signals, and thereafter performing said generating, applying, correlating and determining for another ranging code in the set of possible ranging codes based on the updated received signals.

12. An apparatus comprising:
    a plurality of antennas;
    a receiver configured to be coupled to the plurality of antennas and to produce received signals associated with energy received by respective ones of the plurality of antennas, wherein the received energy comprises a ranging transmission from one or more other wireless communication devices, each ranging transmission comprising a ranging code selected from a set of possible ranging codes;
    a controller configured to be coupled to the receiver, wherein the controller is configured to:
        generate from the received signals a ranging code specific receive beamforming weight vector for a ranging code in the set of possible ranging codes;
        apply the ranging code specific receive beamforming weight vector to corresponding ranging code specific signals derived from the received signals to produce ranging code specific beamformed signals;
        correlate the ranging code specific beamformed signals to produce correlation results; and
        determine whether the ranging code is present in the received energy based on the correlation results.

13. The apparatus of claim 12, wherein the controller is further configured to generate a differential channel covariance matrix for the ranging code from the corresponding ranging code specific signals and the received signals, and to compute the ranging code specific receive beamforming weight vector from the differential channel covariance matrix.

14. The apparatus of claim 13, wherein the controller is further configured to compute a sum of columns of a ranging channel covariance matrix from the differential channel covariance matrix and to compute the ranging code specific beamforming weight vector from the ranging channel covariance matrix.

15. The apparatus of claim 14, wherein the controller is configured to correlate by computing a power ratio of a peak signal-to-noise floor from the correlation results, and the controller is configured to compare the power ratio with a threshold and determine that the ranging code is present in the received energy when the power ratio exceeds the threshold.

16. The apparatus of claim 13, wherein the controller is configured to compute the differential channel covariance matrix by computing, for each of the plurality of antennas, a sum, over a plurality of groups of subcarriers, of products obtained from multiplication of values of the ranging code specific signals for the ranging code at different subcarriers within a corresponding group of subcarriers.

17. The apparatus of claim 12, wherein the controller is further configured to remove from the received signals a contribution associated with the ranging code determined to be present in the received energy to thereby produce updated received signals, and thereafter to perform the generate, apply, correlate and determine functions for another ranging code based on the updated received signals.

18. Logic encoded in one or more non-transitory tangible media for execution and when executed operable to:
    generate a ranging code specific receive beamforming weight vector for a ranging code in a set of possible ranging codes from received signals derived from energy received at a plurality of antennas of a wireless communication device, wherein the received energy comprises a ranging transmission from one or more other wireless communication devices and wherein each ranging transmission comprises a ranging code selected from the set of possible ranging codes;
    apply the ranging code specific receive beamforming weight vector to corresponding ranging code specific signals derived from the received signals to produce ranging code specific beamformed signals;
    correlate the ranging code specific beamformed signals to produce correlation results; and
    determine whether the ranging code is present in the received energy based on the correlation results.

19. The logic of claim 18, wherein the logic that generates comprises logic that is configured to generate a differential channel covariance matrix for the ranging code from the corresponding ranging code specific signals and the received signals and logic that is configured to compute the ranging code specific receive beamforming weight vector from the differential channel covariance matrix.

20. The logic of claim 19, wherein the logic that generates comprises logic that is configured to compute a sum of columns of a ranging channel covariance matrix from the differential channel covariance matrix and logic that computes the ranging code specific beamforming weight vector from the ranging channel covariance matrix.

21. The logic of claim 20, wherein the logic that correlates comprises logic that is configured to compute a power ratio of a peak signal-to-noise floor from the correlation results, and wherein the logic that determines comprises logic that compares the power ratio with a threshold and determines that the ranging code is present in the received energy when the power ratio exceeds the threshold.

22. The logic of claim 19, wherein the logic that computes the differential channel covariance matrix comprises logic configured to compute, for each of the plurality of antennas, a sum, over a plurality of groups of subcarriers, of products obtained from multiplication of values of the ranging code specific signals for the ranging code at different subcarriers within a corresponding group of subcarriers.

23. The logic of claim 18, and further comprising logic that is configured to compute a power corresponding to each ranging code from the respective ranging code specific signals and to sort the ranging codes in order of decreasing power, and to execute the logic that generates, applies, correlates and determines for each ranging code in said order.

24. The logic of claim 18, and further comprising logic that is configured to remove from the received signals a contribution associated with the ranging code determined to be present in the received energy to thereby produce updated received signals, and to execute the logic that generates, applies, correlates and determines for another ranging code based on the updated received signals.

* * * * *